(12) United States Patent
Aleshin et al.

(10) Patent No.: US 8,666,018 B2
(45) Date of Patent: Mar. 4, 2014

(54) NUCLEAR FUEL ROD PLENUM SPRING ASSEMBLY

(75) Inventors: Yuriy Aleshin, Columbia, SC (US);
Stephen H. Green, Columbia, SC (US);
Andrew Atwood, Columbia, SC (US);
Hemant Shah, Columbia, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 575 days.

(21) Appl. No.: 12/985,430

(22) Filed: Jan. 6, 2011

(65) Prior Publication Data

US 2012/0177170 A1 Jul. 12, 2012

(51) Int. Cl.
*G21C 3/00* (2006.01)

(52) U.S. Cl.
USPC .............................. 376/412; 376/364; 376/418

(58) Field of Classification Search
USPC .......................................... 376/364, 412, 418
See application file for complete search history.

(56) References Cited

U.S. PATENT DOCUMENTS

| 4,273,616 | A | | 6/1981 | Andrews | |
|---|---|---|---|---|---|
| 4,302,295 | A | | 11/1981 | Shimada | |
| 4,612,159 | A | | 9/1986 | Abe et al. | |
| 4,672,791 | A | * | 6/1987 | Rieben et al. | 53/327 |
| 5,329,566 | A | * | 7/1994 | King | 376/418 |
| 5,367,547 | A | * | 11/1994 | Hida et al. | 376/435 |
| 5,448,034 | A | * | 9/1995 | Skipper et al. | 219/74 |
| 2010/0142668 | A1 | * | 6/2010 | Lee et al. | 376/412 |

FOREIGN PATENT DOCUMENTS

| JP | 9113662 A | 5/1997 |
|---|---|---|
| JP | 10020061 A | 1/1998 |

OTHER PUBLICATIONS

International Preliminary Report on Patentability for PCT/US2011/066343 dated Jul. 10, 2013 (Form PCT/IB/373, Form PCT/ISA/237).
Written Opinion of the International Searching Authority for PCT/US2011/066343 dated Apr. 18, 2012 (Form PCT/ISA/237).

* cited by examiner

*Primary Examiner* — Timothy A Brainard
(74) *Attorney, Agent, or Firm* — Joseph C. Spadacene; Westinghouse Electric Company LLC

(57) ABSTRACT

A nuclear fuel rod plenum spring assembly that has a spacer affixed to the lower end of the ground torsion spring. The spacer has a substantially flat surface on its underside that presses against the upper surface of the upper fuel pellets to spread the load of the spring over the top surface of the upper most fuel pellet.

12 Claims, 6 Drawing Sheets

NUCLEAR FUEL ROD PLENUM SPRING ASSEMBLY

BACKGROUND

1. Technical Field

This invention pertains generally to a nuclear reactor internals structure and more particularly to components such as fuel rods that employ an active ingredient within a cladding that is held in position by a plenum spring.

2. Related Art

The primary side of nuclear reactor power generating systems which are cooled with water under pressure comprise a closed circuit which is isolated and in heat exchange relationship with a secondary side for the production of useful energy. The primary side comprises the reactor vessel enclosing a core internal structure that supports a plurality of fuel assemblies containing fissile material, the primary circuit within heat exchange steam generators, the inner volume of a pressurizer, pumps and pipes for circulating pressurized water; the pipes connecting each of the steam generators and pumps to the reactor vessel independently. Each of the parts of the primary side comprising a steam generator, a pump, and a system of pipes which are connected to the vessel form a loop of the primary side.

For the purpose of illustration, FIG. 1 shows a simplified nuclear reactor primary system, including a generally cylindrical reactor pressure vessel 10 having a closure head 12 enclosing a nuclear core 14. A liquid reactor coolant, such as water, is pumped into the vessel 10 by pump 16 through the core 14 where heat energy is absorbed and is discharged to a heat exchanger 18, typically referred to as the steam generator, in which heat is transferred to a utilization circuit (not shown), such as a steam driven turbine generator. The reactor coolant is then returned to the pump 16, completing the primary loop. Typically, the plurality of the above described loops are connected to a single reactor vessel 10 by reactor coolant piping 20.

An exemplary reactor design is shown in more detail in FIG. 2. In addition to the core 14 comprised of a plurality of parallel, vertical, co-extending fuel assemblies 22, for purposes of this description, the other vessel internal structures can be divided into the lower internals 24 and the upper internals 26. In conventional designs, the lower internals' function is to support, align and guide core components and instrumentation as well as direct flow within the vessel. The upper internals restrain or provide a secondary restraint for the fuel assemblies 22 (only two of which are shown for simplicity in this figure), and support and guide instrumentation and components, such as control rods 28. In the exemplary reactor shown in FIG. 2, coolant enters the reactor vessel 10 through one or more inlet nozzles 30, flows down through an annulus between the vessel and the core barrel 32, is turned 180° in a lower plenum 34, passes upwardly through a lower support plate 37 and a lower core plate 36 upon which the fuel assemblies 22 are seated and through and about the assemblies. In some designs, the lower support plate 37 and the lower core plate 36 are replaced by a single structure, the lower core support plate, at the same elevation as 37. The coolant flow through the core and surrounding area 38 is typically large on the order of 400,000 gallons per minute for a four loop plant (generally, the flow rate is approximately 100,000 gallons per minute per loop), at a velocity of approximately 20 feet per second. The resulting pressure drop and frictional forces tend to cause the fuel assemblies to rise which movement is restrained by the upper internals, including a circular upper core plate 40. Coolant exiting the core 14 flows along the underside of the upper core plate 40 and upwardly through a plurality of perforations 42. The coolant then flows upwardly and radially to one or more outlet nozzles 44.

The upper internals 26 can be supported from the vessel or the vessel head and include an upper support assembly 46. Loads are transmitted between the upper support assembly 46 and the upper core plate 40 primarily by a plurality of support columns 48. A support column is aligned above a selected fuel assembly 22 and perforations 42 in the upper core plate 40.

The rectilinearly moveable control rods 28 typically include a drive shaft 50 and a spider assembly 52 of neutron poison rods that are guided through the upper internals 26 and into aligned fuel assemblies 22 by control rod guide tubes 54. The guide tubes are fixedly joined at one end to the upper support assembly 46 and connected at the other end to the top of the upper core plate 40 by a split pin force fit into the top of the upper core plate 40. The pin configuration provides for ease of guide tube assembly and replacement if ever necessary and assures that the core loads, particularly under seismic or other high loading accident conditions are taken primarily by the support columns 48 and not the guide tubes 54. This support column arrangement assists in retarding guide tube deformation under accident conditions which could detrimentally affect control rod insertion capability.

FIG. 3 is an elevational view, represented in vertically shortened form, of a fuel assembly being generally designated by reference character 22. The fuel assembly 22 is the type used in a pressurized water reactor and has a structural skeleton which, at its lower end, includes a bottom nozzle 58. The bottom nozzle 58 supports the fuel assembly 22 on a lower core support plate 36 in the core region of the nuclear reactor. In addition to the bottom nozzle 58, the structural skeleton of the fuel assembly 22 also includes a top nozzle 62 at its upper end and a number of guide thimbles 54, which extend longitudinally between the bottom and top nozzles 58 and 62 and at opposite ends are rigidly attached thereto.

The fuel assembly 22 further includes a plurality of transverse grids 64 axially spaced along and mounted to the guide thimbles 54 (also referred to as guide tubes) and an organized, array of elongated fuel rods 66 transversely spaced and supported by the grids 64. Although it cannot be seen in FIG. 3, the grids 64 are conventionally formed from orthogonal straps that are interleaved in an egg-crate pattern with the adjacent interface of four straps defining approximately square support cells through which the fuel rods 66 are supported in transversely spaced relationship with each other. In many conventional designs, springs and dimples are stamped into the opposing walls of the straps that form the support cells. The springs and dimples extend radially into the support cells and capture the fuel rods there between; exerting pressure on the fuel rod cladding to hold the rods in position. Also, the assembly 22 has an instrumentation tube 68 located in the center thereof that extends between and is mounted to the bottom and top nozzles 58 and 62. With such an arrangement of parts, fuel assembly 22 forms an integral unit capable of being conveniently handled without damaging the assembly of parts.

As mentioned above, the fuel rods 66 in the array thereof in the assembly 22 are held in spaced relationship with one another by the grids 64 spaced along the fuel assembly length. Each fuel rod 66 includes a plurality of nuclear fuel pellets 70 and is closed at its opposite ends by upper and lower end plugs 72 and 74. The pellets 70 are maintained in a stack by a plenum spring 76 disposed between the upper end plug 72 and the top of the pellet stack. The fuel pellets 70, composed of fissile material, are responsible for creating the reactive power of the reactor. The cladding which surrounds the pellets functions as a barrier to prevent the fission byproducts from entering the coolant and further contaminating the reactor system.

To control the fission process, a number of control rods 78 are reciprocally moveable in the guide thimbles 54 located at predetermined positions in the fuel assembly 22. Specifically, a rod cluster control mechanism 80, positioned above the top nozzle 62, supports the control rods 78. The control mechanism has an internally threaded cylindrical hub member 82 with a plurality of radially extending flukes or arms 52. Each arm 52 is interconnected to the control rods 78 such that the control rod mechanism 80 is operable to move the control rods vertically in the guide thimbles 54 to thereby control the fission process in the fuel assembly 22, under the motive power of control rod drive shafts 50 which are coupled to the control rod hubs 80, all in a well known manner.

As previously mentioned, the fuel assemblies are subject to hydraulic forces that exceed the weight of the fuel rods and thereby exert significant forces on the fuel rods and the fuel assemblies. In addition, there is significant turbulence in the coolant in the core caused by mixing vanes on the upper surfaces of the straps of many grids, which promote the transfer of heat from the fuel rod cladding to the coolant. The substantial flow forces and turbulence can result in severe vibration of the fuel rod cladding if motion of the fuel rods is not restrained.

Recently, a concern has been expressed about small pellet chips found in the fuel rod plenum in a fraction of fuel rods following back fill and sealing during manufacture. An investigation suggests that one mechanism responsible for top pellet chipping is non-uniform pressure distribution on the top surface of the fuel pellets. It was concluded that the end coil of the plenum spring does not make perfect contact with the top pellet. This leads to some part of the top pellet surface experiencing a significant axial load which could cause chipping. This affect was confirmed during pressure tests. It should be noted that the plenum spring design cannot provide uniform pressure distribution on the top surface of the pellet that it interfaces with due to limited contact area corresponding to the end coil spring geometry. A better view of the plenum spring 76 can be had by reference to FIG. 4 which clearly shows the end coil geometry 84.

Accordingly, an improved means of holding down the fuel pellets within the fuel element cladding is desired that will provide uniform pressure on the upper surface of the top pellet.

Furthermore, such an improved design is desired that will facilitate installation, limit consequences of unlikely installation mistakes and minimize potential performance issues.

SUMMARY OF THE INVENTION

These and other objects are achieved by an improved elongated reactive member, such as a fuel element or control rod, for use in a nuclear core. The reactive member is formed from a tubular cladding substantially extending the elongated length of the reactive member with a top end plug sealing off a top end of a central hollow cavity of the tubular cladding and a bottom end plug sealing off a bottom end of the central hollow cavity of the tubular cladding. An active element substantially occupies a lower portion of the central hollow cavity and a spring substantially extends between the top end plug and an upper surface of the active element, pressuring the active element toward the lower end plug. A spacer is positioned between a lower end of the spring and the upper surface of the active element, spreading the force of the spring over a larger portion of the upper surface of the active element than would be applied by the spring directly.

In one embodiment, the spring is a ground torsion spring and preferably the spring is either mechanically or metallurgically attached to the spacer. Preferably, the spacer has a substantially flat head facing the upper surface of the active element and an opposite side that extends in an axial direction of the elongated dimension of the cladding with the opposite side being attached to the spring. Desirably, a distal portion of the opposite side has a width that is smaller than the width of the head and a fillet is formed between the width of the head and the width of the distal portion.

In another embodiment, an opening extends through the head from a side facing the upper surface of the active element through the spacer and out the distal end of the opposite side. Preferably, at least a portion of the opening has a hex contour.

In one embodiment where the spring is mechanically attached to the spacer, a spiral thread extends axially along a radial surface of the opposite end of the spacer and a lower portion of the spring is wound around the spiral thread. In another embodiment, where the spring is mechanically attached to the spacer, an upper portion of the opposite side of the spacer is a split tube with an outwardly, radially extending lip that mechanically attaches to the spring.

In one embodiment the reactive member is a nuclear fuel element and in still another embodiment, the reactive member is a nuclear control rod.

Preferably, the spacer is substantially round and spaced from the inner wall of the cladding.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENTS

Figure 1:
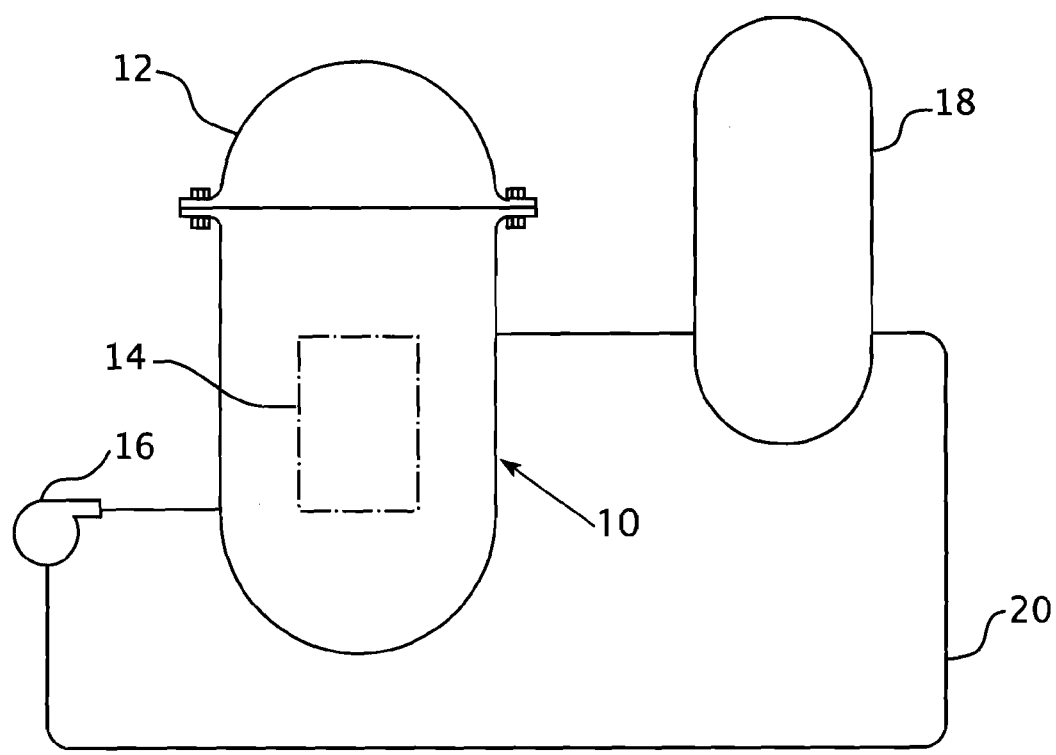
FIG. 1 is a simplified schematic of a nuclear reactor system to which this invention can be applied.
Figure 2:
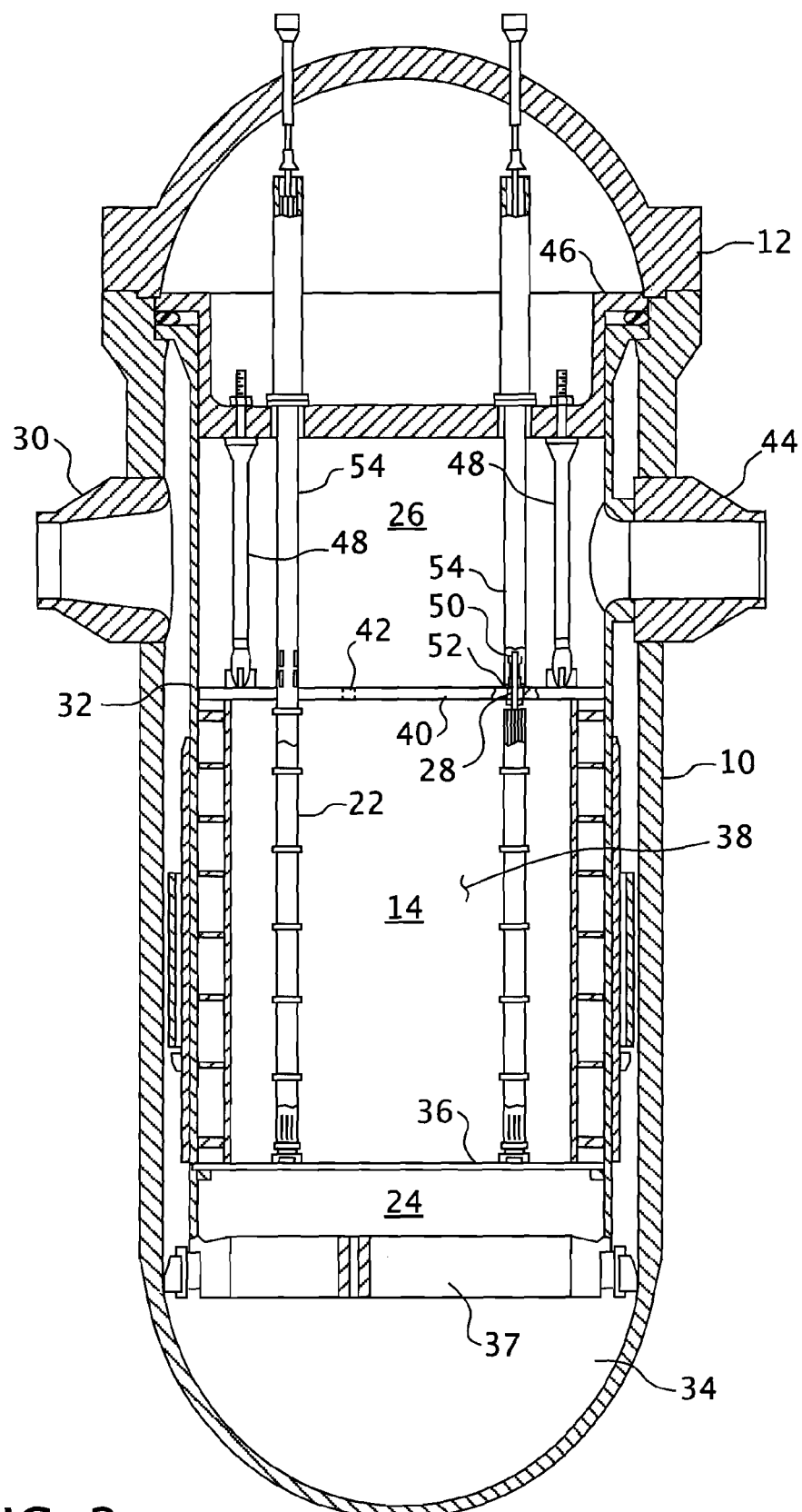
FIG. 2 is an elevational view, partially in section, of a nuclear reactor vessel and internal components to which this invention can be applied.
Figure 3:
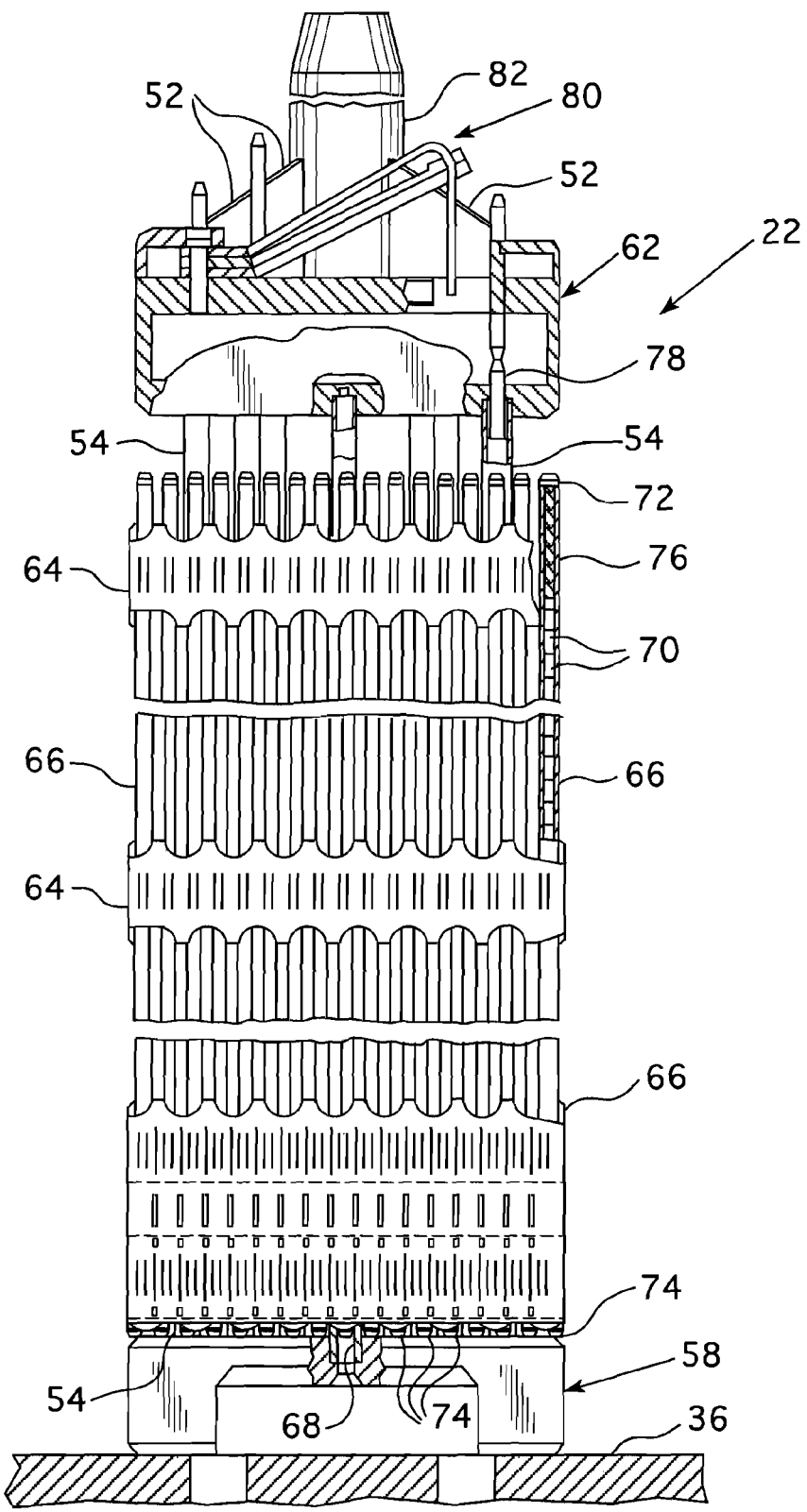
FIG. 3 is an elevational view, partially in section, of a fuel assembly illustrated in vertically shortened form, with parts broken away for clarity.
Figure 4:
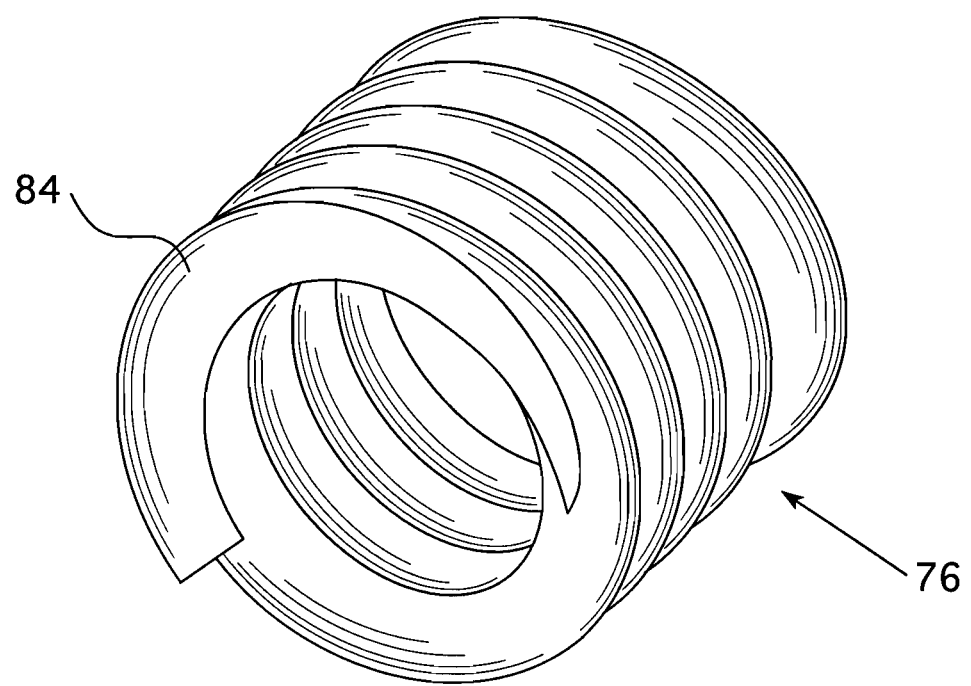
FIG. 4 is a perspective view of a plenum spring illustrating the end coil geometry.

To achieve the foregoing objectives, this invention introduces an intermediate part between the plenum spring and top pellet of the fuel pellet stack to create a uniform contact distribution and reduce chip migration potential between the fuel rod plenum and the pellet stack. The new intermediate element between the top pellet and the spring end coil is designed to provide a uniform pressure distribution and reduce chip migration potential. Desirably, this element is attached to the existing plenum spring. In one embodiment, illustrated in FIGS. 5 and 6, the intermediate element is a threaded spacer 86 that forms an interface between the plenum spring and the top surface of the top pellet. The spacer 86 is designed to provide a uniform contact pressure over its substantially flat head 88, on the top surface of the top pellet and reduce the potential for small pellet chip migration. The threaded spacer also has features to facilitate the spacer to spring assembly process. The threaded spacer 86 has a central hole 90 to facilitate proper fuel rod pressurization in an unlikely event where the plenum spring assembly is incorrectly installed and to prevent any related performance issues. If the fuel rod is not properly pressurized with He it could experience a reduction in diameter due to the high system external operating pressure that is not compensated by the proper fuel rod internal pressure, which could reduce the holding forces applied by the fuel assembly grid springs. Also, improper pressurization can lead to increased fuel element operating temperatures, due to lower thermal conductivity between the pellets and the cladding, possibly resulting in excessive clad corrosion and potential fuel melting. Any of these performance issues can lead to fuel rod failure resulting in an undesirable fission product release into the coolant. The central hole 90 has a hex contour 92 at its opening in the flat head 88 to facilitate coupling the rear tubular portion of the spacer 86 to the spring 76. The rear tubular portion has a spiral thread 94 that extends from the opposite end 96 just short of the rear side of the head 88. A hexed tool can be inserted in the hex opening 92 to wind the spacer 86 onto the plenum spring 76 until the end coil seats snuggly on the back of the head 88.

Desirably, the threaded spacer 86 is one machined piece that basically comprises two functional regions in the fuel element axial direction: a pellet/clad interface region 88 and a spring interface region 98. Preferably, the total length of the spacer 86 should prevent rotation of the spacer inside of the cladding. The pellet/clad interface 88 maximum diameter of the spacer should be less than the pellet minimum outside diameter under all conditions to ensure that the spacer does not compromise clad structural integrity. Preferably, the pellet/clad interface 88 maximum length, i.e., the dimension in the fuel element axial direction, should be as minimal as practically possible. The pellet/clad interface length minimum value is limited by the ability to uniformly distribute the spring force and distortion during manufacturing. The maximum value of the pellet/clad interface length is limited by the additional spring compression and rod internal pressure penalty. Generally, the plenum spring is compressed during fuel rod fabrication to a pre-determined force within a range of forces for each fuel rod type. The maximum force within the range is established to assure the structural integrity of the fuel rod welds and pellets. A force above the maximum set by the range could impair the ability to produce a proper end plug weld. The amount of compression of the plenum spring is controlled by the plenum length. The free volume within the fuel element cladding has to accommodate the fission gases released during reactor operation. Therefore, any reduction in plenum volume will result in increases in fuel rod internal pressure over its operating life, which may lead to an unpredicted fuel rod outer diameter increase resulting in a decrease in thermal conductivity between the cladding and the pellets. The pellet/clad interface region 88 will reduce the plenum length and plenum volume and increase the plenum spring deflection/force and rod internal pressure. It was confirmed that the length of the pellet/clad region of the spacer is acceptable so long as it is factored into the design of the spring. A fillet radius 100 should be present between the back side of the head 88 and the tubular section 102 to prevent pressure concentration at the pellet to spacer bearing surface. The thread dimensions and profile on the spring interface 98 depends upon the spring design to allow for proper fit between the spring wire and the thread profile. The thread vanish zone is the area between the thread 94 and the fillet 100 and the thread vanish zone diameter plus two times the spring interface fillet radius should not exceed the minimum spring inner diameter to ensure proper interface between the spring end coil and the spacer 86. The central hole 90 diameter should be present to allow for fuel rod pressurization in case of "incorrect" assembly installation and the hex size should be sufficient to apply the required torque during assembly. The torque should be sufficient to prevent the spacer "from becoming" loose during shipping and handling and to mitigate spring damage during installation.

Pressure tests have demonstrated that the spacer is able to provide a uniform pressure distribution and confirm that the spacer design reduces small pellet chipping frequency. Additionally, the fuel rod plenum spring assembly design of this embodiment is capable of meeting the design objectives to provide a uniform pressure distribution in pellet-to-spacer contact and to reduce the potential for small pellet chip migration. The design also includes features to facilitate spacer installation, limit consequences of unlikely installation mistakes and minimize potential performance issues.

Figure 5:
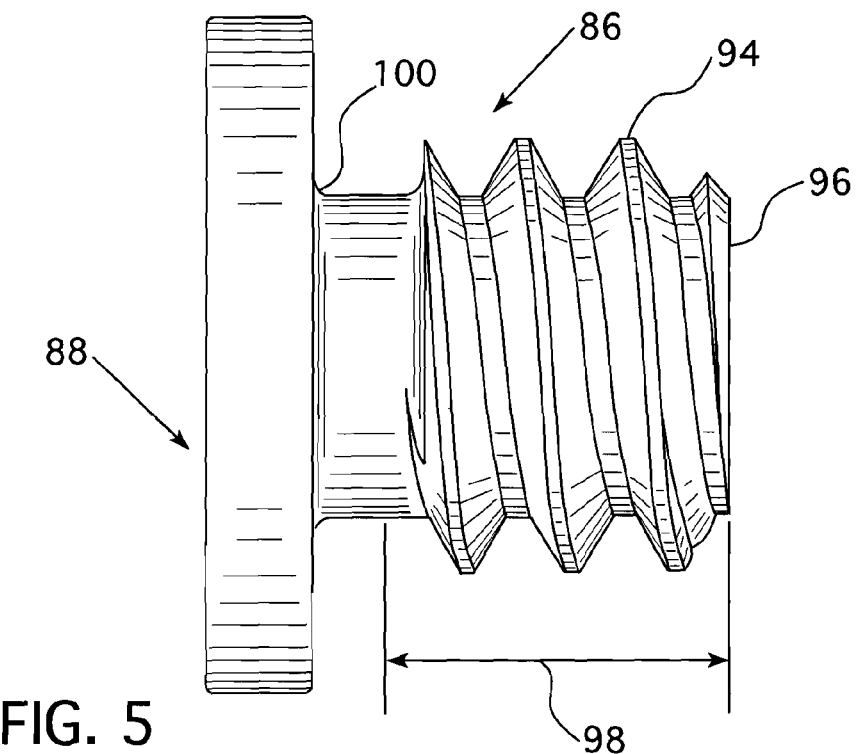
FIG. 5 is a perspective view of a threaded spacer of one embodiment of this invention.
Figure 6:
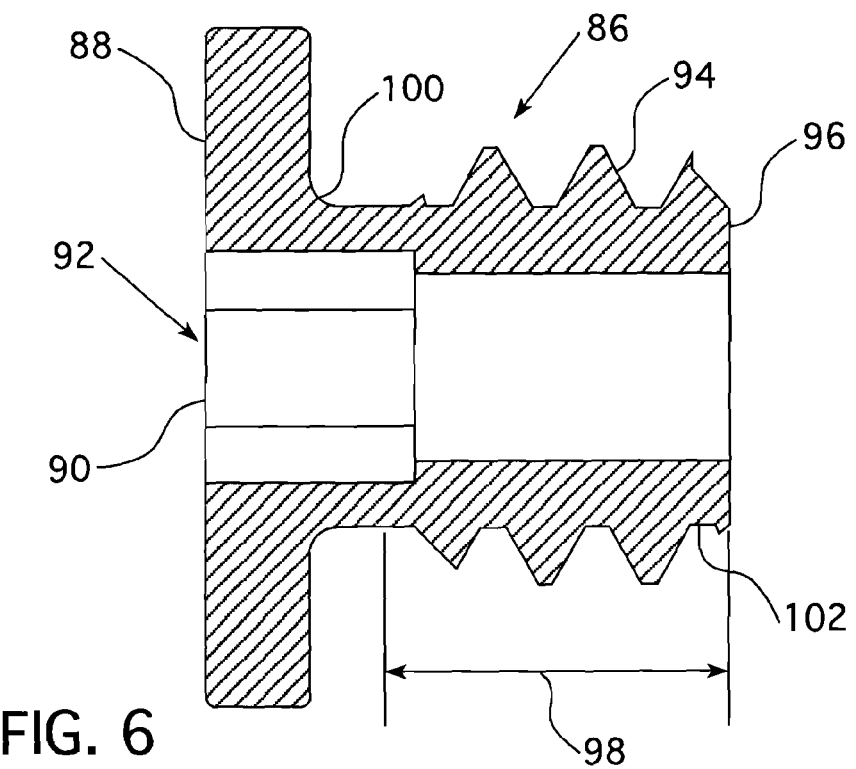
FIG. 6 is a sectional view of the embodiment shown in FIG. 5.
Figure 7:
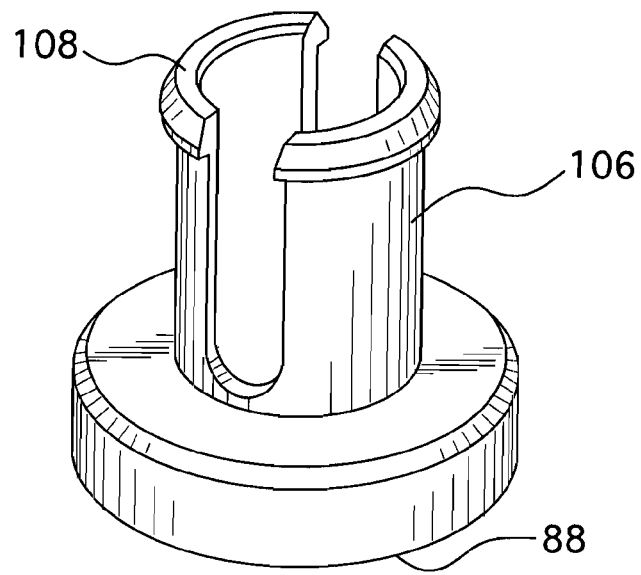
FIG. 7 is a perspective view of a two-slot split tube embodiment of the spacer of this invention.
Figure 8:
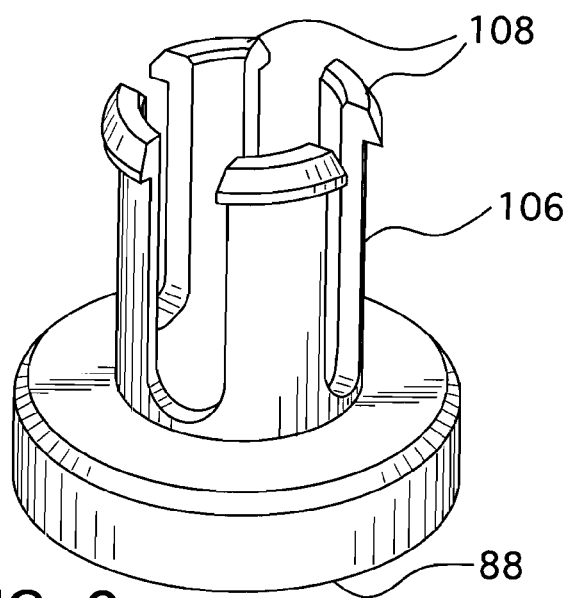
FIG. 8 is a perspective view of a four-slot split tube embodiment of the spacer of this invention.
Figure 9:
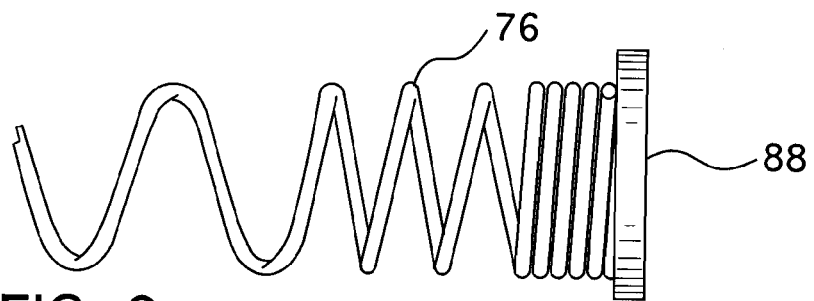
FIG. 9 is a side view of a welded washer embodiment of the spacer-spring assembly of this invention.

FIGS. 7, 8 and 9 show alternate embodiments to the threaded spacer illustrated in FIGS. 5 and 6. The embodiments illustrated in FIGS. 7, 8 and 9 each have the same flat head 88 as was previously described with regard to the threaded spacer shown in FIGS. 5 and 6. In FIGS. 7 and 8, the rear side of the spacer is a slotted tubular member 106 with the embodiment shown in FIG. 7 having the slots spaced 180° apart while the embodiment in FIG. 8 has the slots spaced 90° apart. Each of the two embodiments has a lip 108 that fits over a rung of the spring 76 to secure the spacer to the spring. In the embodiment shown in FIG. 9, the head 88 is welded directly to the end coil of the plenum spring 76.

While specific embodiments of the invention have been described in detail, it will be appreciated by those skilled in the art that various modifications and alternatives to those details could be developed in light of the overall teachings of the disclosure. For example, though the previous embodiments have described as being applied to a nuclear fuel element, the spring and spacer assembly taught herein can be applied to control rods as well, wherein the active element will be a neutron absorber rather than the fissile fuel pellets. Accordingly, the particular embodiments disclosed are meant to be illustrative only and not limiting as to the scope of the invention which is to be given the full breadth of the appended claims and any and all equivalents thereof.

What is claimed is:

1. An elongated, reactive member for use in a nuclear core comprising:
   a tubular cladding substantially extending an elongated length of the reactive member;
   a top end plug sealing off a top end of a central hollow cavity of the tubular cladding;
   a bottom end plug sealing off a bottom end of the central hollow cavity of the tubular cladding;
   an active element substantially occupying a lower portion of the central hollow cavity;
   a spring substantially extending between the top end plug and an upper surface of the active element, pressuring the active element toward the lower end plug; and
   a spacer between a lower end of the spring and the upper surface of the active element, spreading a force of the spring over a larger portion of the upper surface of the active element than would be applied by the spring directly wherein the spacer has a substantially flat head facing the upper surface of the active element and an opposite side that extends in an axial direction of an elongated dimension of the cladding with the opposite side having a distal portion extending within and being mechanically attached to the spring and a diameter of the distal portion is less than a diameter of the substantially flat head.

2. The reactive member of claim 1 wherein the spring is a ground torsion spring.

3. The reactive member of claim 1 wherein a circumferential fillet is formed between the width of the head and the width of the distal portion.

4. The reactive member of claim 1 wherein an opening extends through the head from a side facing the upper surface of the active element through the spacer and out a distal end of the opposite side.

5. The reactive member of claim 4 wherein at least a portion of the opening has a hex contour.

6. The reactive member of claim 1 wherein a spiral thread extends axially along a radial surface of the distal portion of the opposite side of the spacer and a lower portion of the spring is wound around the spiral thread.

7. The reactive member of claim 1 wherein an upper portion of the opposite side of the spacer is a split tube with an outwardly, radially extending lip that mechanically attaches to the spring.

8. The reactive member of claim 1 wherein a lower end of the spring is welded to the spacer.

9. The reactive member of claim 1 wherein the reactive member is a nuclear fuel element.

10. The reactive member of claim 1 wherein the reactive member is a nuclear control rod.

11. The reactive member of claim 1 wherein the spacer is substantially round and spaced from an inner wall of the cladding.

12. A nuclear fuel assembly having a plurality of nuclear fuel elements with at least some of the nuclear fuel elements comprising:
- a tubular cladding substantially extending an elongated length of the nuclear fuel element;
- a top end plug sealing off a top end of a central hollow cavity of the tubular cladding;
- a bottom end plug sealing off a bottom end of the central hollow cavity of the tubular cladding;
- an array of nuclear fuel pellets substantially occupying a lower portion of the central hollow cavity;
- a spring substantially extending between the top end plug and an upper surface of the nuclear fuel pellets, pressuring the nuclear fuel pellets toward the lower end plug; and
- a spacer situated within the central hollow cavity between a lower end of the spring and the upper surface of the nuclear fuel pellets, spreading a force of the spring over a larger portion of the upper surface of the nuclear fuel pellets than would be applied by the spring directly, wherein the spacer has a substantially flat head facing the upper surface of the active element and an opposite side that extends in an axial direction of an elongated dimension of the cladding with the opposite side having a distal portion extending within and being mechanically attached to the spring and a diameter of the distal portion is less than a diameter of the substantially flat head.

* * * * *